United States Patent
Fujii

(10) Patent No.: US 8,134,614 B2
(45) Date of Patent: Mar. 13, 2012

(54) IMAGE PROCESSING APPARATUS FOR DETECTING AN IMAGE USING OBJECT RECOGNITION

(75) Inventor: Miyuki Fujii, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 305 days.

(21) Appl. No.: 12/261,365

(22) Filed: Oct. 30, 2008

(65) Prior Publication Data

US 2009/0128652 A1 May 21, 2009

(30) Foreign Application Priority Data

Nov. 2, 2007 (JP) .................................. 2007-286086

(51) Int. Cl.
*H04N 5/262* (2006.01)

(52) U.S. Cl. ...................... 348/239; 348/143; 348/222.1; 382/181

(58) Field of Classification Search .................. 348/143, 348/239; 382/181
See application file for complete search history.

(56) References Cited

U.S. PATENT DOCUMENTS

| 5,122,825 | A | * | 6/1992 | Tokumaru et al. | ............... 396/78 |
| 7,068,842 | B2 | * | 6/2006 | Liang et al. | .................... 382/181 |
| 2005/0257423 | A1 | * | 11/2005 | McDonald et al. | ............ 47/57.6 |

FOREIGN PATENT DOCUMENTS

| JP | 2005-12548 | 1/2005 |
| JP | 2005-57743 | 3/2005 |

* cited by examiner

*Primary Examiner* — Jason Chan
*Assistant Examiner* — Cynthia Calderon
(74) *Attorney, Agent, or Firm* — Brundidge & Stanger, P.C.

(57) ABSTRACT

In an image processing apparatus, minimum width and height and maximum width and height of an object to be detected are calculated on the basis of photographing conditions, an object detection range and a size of the object to be detected and an image reduction coefficient is set on the basis of the calculated minimum width and height and maximum width and heights whereby detection can be achieved while keeping the detection accuracy of image processing intact and an intruding person can be detected at a high speed at a necessarily lowest processing speed.

2 Claims, 8 Drawing Sheets

IMAGE PROCESSING APPARATUS FOR DETECTING AN IMAGE USING OBJECT RECOGNITION

INCORPORATION BY REFERENCE

The present application claims priority from Japanese application JP2007-286086 filed on Nov. 2, 2007, the content of which is hereby incorporated by reference into this application.

BACKGROUND OF THE INVENTION

The present invention relates to a monitor system and more particularly, to an image processing apparatus based on an image process for recognizing an object present inside a monitor area.

In a conventional video monitor apparatus, the inside of a monitor area was photographed at predetermined intervals with an image pickup unit such as a TV (television) camera and an acquired image is analyzed through image processing to recognize an object.

For example, in JP-A-2005-057743, an image obtained by photographing the inside of a monitor area is compared with a background image registered in advance to thereby recognize and detect an object and thereafter the detected object is pursued through a template matching method.

Also, in JP-A-2005-012548, with a view to decreasing the load imposed on an operation process as far as possible in a motion detection process, a general-use hardware engine for image reduction used for the purpose of generating an image for thumb nail display in, for example, a digital camera is utilized so that image data may be reduced and then an image process may be conducted.

In JP-A-2005-057743 mentioned as above, the background image and the input image are processed while keeping their sizes intact and so a slow processing speed results. More particularly, if a CPU (central processing unit) of low processing speed is used or if the number of pixels per frame is large and the number of pieces of data to be processed is large as in the case of, for example, a mega-pixel camera, the image processing cannot be carried out on real time base, thus leading to the possibility that missing of detection and erroneous detection will occur.

In case the number of pieces of data to be processed is decreased by reducing (thinning out) an image so as to relatively raise the processing speed, the image needs to be reduced simply. For example, when the distance from the camera is considered, an image picked up by the camera nears at the lower side of the screen and it goes away as it approaches the upper side of the screen. Accordingly, when considering the size of the object by the number of pixels, the object that exists in the position near from the camera has a larger pixels, and the same object that exists in the position far from the camera has a smaller pixels.

Since the image processing is executed in a unit of pixel (one pixel corresponding to one data piece), the result of processing becomes accurate as the number of pixels increases but the processing speed is low whereas the processing speed is fast as the number of pixels decreases but the accuracy of the processing result will be impaired. Especially, when many people come into the monitor area or a person coming thereinto is photographed in a large size, a decrease in the processing speed and a deterioration in the detection capability will result.

Accordingly, in order to execute the image processing accurately, the ratio of reduction of an image (reduction coefficient) needs to be changed appropriately in accordance with conditions of camera photography. In other words, in order for the image processing to be carried out constantly at appropriate reduction coefficients, the reduction coefficients need to be determined one by one by the user while changing the set value slightly and the reduction coefficient cannot be fixed. Therefore, an appropriate reduction coefficient must be computed in accordance with a monitoring location and a large processing amount is again generated.

SUMMARY OF THE INVENTION

The present invention contemplates elimination of the aforementioned problems and it is an object of this invention to provide object detection method and image monitoring apparatus which can execute the processing on real time base and can prevent missing of detection and erroneous detection. More specifically, the present invention intends to provide an image processing apparatus in which the set value can be changed automatically to an appropriate image reduction coefficient without increasing extensively the amount of image processing and an object can be detected even in an environment where the size of the object changes largely between the frontal side and the depth side.

To accomplish the above object, according to the present invention, an image processing apparatus for detecting through an image process an input image inputted from a camera adapted to photograph the inside of a monitor area and monitoring the inside of the monitor area by using an object recognition method, comprises means for reducing the input image and a background image at a predetermined reduction coefficient to prepare a reduced input image and a reduced background image, means for performing a differential process between the reduced input image and the reduced background image to prepare a difference image, means for binary-coding the difference image to prepare a monochrome image, and means for recognizing an object from the monochrome image.

An image processing apparatus according to this invention comprises means for inputting set-up information of the camera, an object detection range inside the monitor area and a real size of an object desired to be detected, and means for selecting a point at which the size of the object desired to be detected is minimized inside the object detection range on the basis of the inputted set-up information of the camera, object detection range inside the monitor area and real size of the object desired to be detected and calculating the reduction coefficient from a lump of pixels of the object at the selected minimum point.

According to the present invention, object detection method and image processing apparatus can be provided which can change the set value little by little so as to set the image reduction coefficient to an appropriate value without increasing the amount of work extensively and can detect an object even under an environment where the size of the object changes extensively between the frontal side and the depth side. In other words, the image reduction coefficient can be set automatically to the appropriate value in accordance with the installation environment and therefore, high-speed processing can be achieved while keeping the detection accuracy intact.

Other objects, features and advantages of the invention will become apparent from the following description of the embodiments of the invention taken in conjunction with the accompanying drawings.

DESCRIPTION OF THE EMBODIMENTS

Figure 1:
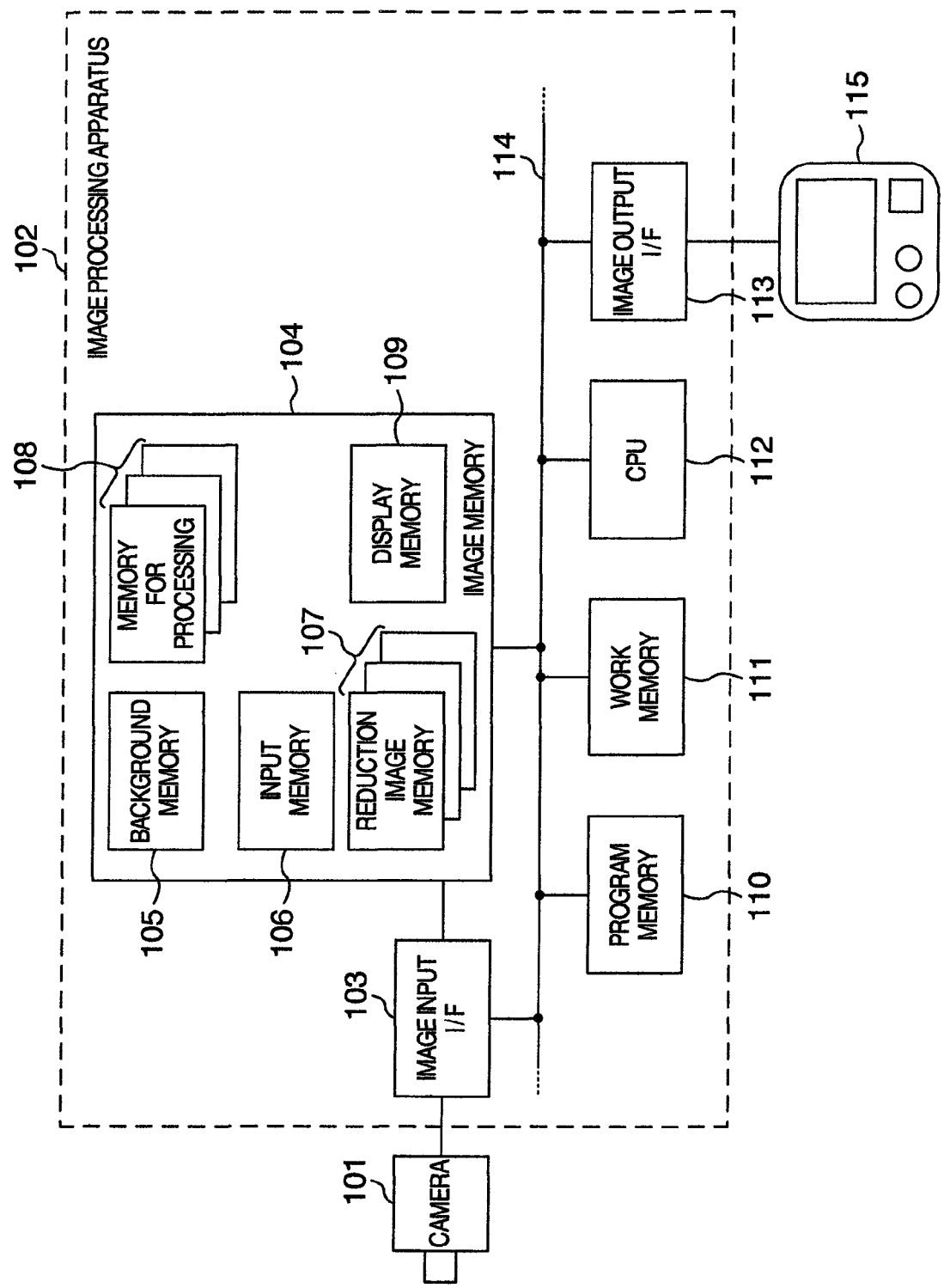
FIG. 1 is a block diagram showing the construction of an embodiment of a video monitoring apparatus according to the present invention.

An embodiment of an image processing apparatus according to the present invention will now be described by making reference to FIG. 1 illustrating in block diagram form the construction of an embodiment of a monitor system using the image processing apparatus of the invention. The monitor system comprises a camera 101 for photographing the inside of a monitor area, a video processing apparatus (image processing apparatus) 102 and a video monitor 115. The image processing apparatus 102 includes an image processing interface (image processing I/F) 103 for performing conversion to a format that can be processed by the image processing apparatus, an image memory 104 used for inter-image operation or to store (save, record or write) of images, a program memory 110, a work memory 111, a CPU (central processing unit) 112, and an image output interface (image output I/F) 113. Then, the image memory 104 includes a background memory 105 for storing (saving, recording or writing) a background image, an input memory 106 for storing a plurality of frames of image data inputted from the image input I/F 103, a reduction image memory 107 for storing (saving, recording or writing) a reduced background image and a reduced input image, a memory for processing 108 used for inter-image operation, and a display memory 109. Designated by reference numeral 114 is a data bus that is used for data transfer between individual components coupled through the data bus 114.

In FIG. 1, the camera 101 photographs the inside of the monitor area and converts a picked-up image into a video signal which in turn is transmitted to the image processing apparatus 102. The line used for transmission is, for example, a dedicated network line or cable line and either or both of a wired line and a wireless line may be used.

In the image processing apparatus 102, the image input I/F 103 receives a video signal transmitted from the camera 101 and an analog video signal is subjected to such a process as conversion to a digital signal (A/D conversion) and conversion to a brightness signal of 256 gradation of 0 to 255 grades and is converted into image data of a format that can be processed by the image processing apparatus. The image data is outputted to the image memory 104 so as to be stored in the input memory 106 inside the image memory 104.

Thus, in the image memory 104, image data inputted from the image input I/F 103 is stored in the input memory 106.

Following a program stored in the program memory 110, the CPU 112 mutually accesses the units coupled through the data bus 114 to control the image processing apparatus 102. For example, the CPU 112 performs an image analysis by using the work memory 111 and image memory 104.

The image output I/F 113 converts image data (digital video signal) stored in the display memory 109 inside the image memory 104 into an analog signal (D/A conversion) and delivers the converted analog video signal to the video monitor 115.

The video monitor 115 displays the video signal received from the image output I/F 113 on the display screen.

In the embodiment of FIG. 1, the camera 101 is a fixed camera. The fixed camera referred to herein means a camera in which the depression angle, height and horizontal angle of the camera and the zoom magnification as well are set to predetermined values when the image pick-up unit such as a camera is installed.

But, in the present embodiment, the use of the fixed camera is not limitative and another type of camera may be employed in which the pan operation (operation for changing the horizontal angle of camera), tilt operation (operation for changing the vertical direction (depression angle)) and zoom magnification or focal distance and, in some case, the camera height as well can be changed arbitrarily through remote control.

In the case of this type of camera whose picture angle such as view-field angle can be changed, setting values of camera set-up conditions in a flowchart useful to explain the procedural operations in the object detection method of the invention to be described later can be changed each time that the picture angle is changed. It is to be noted that the input device used by the user to operate the image processing apparatus 102 (for example, a pointing device such as mouse or keyboard or a dedicated input unit) is not illustrated in FIG. 1. The use of this type of input device is a very general practice and so omitted for simplicity of description.

An embodiment of an object detection method according to the present invention will now be described with reference to FIGS. 1 to 6.

Figure 2:
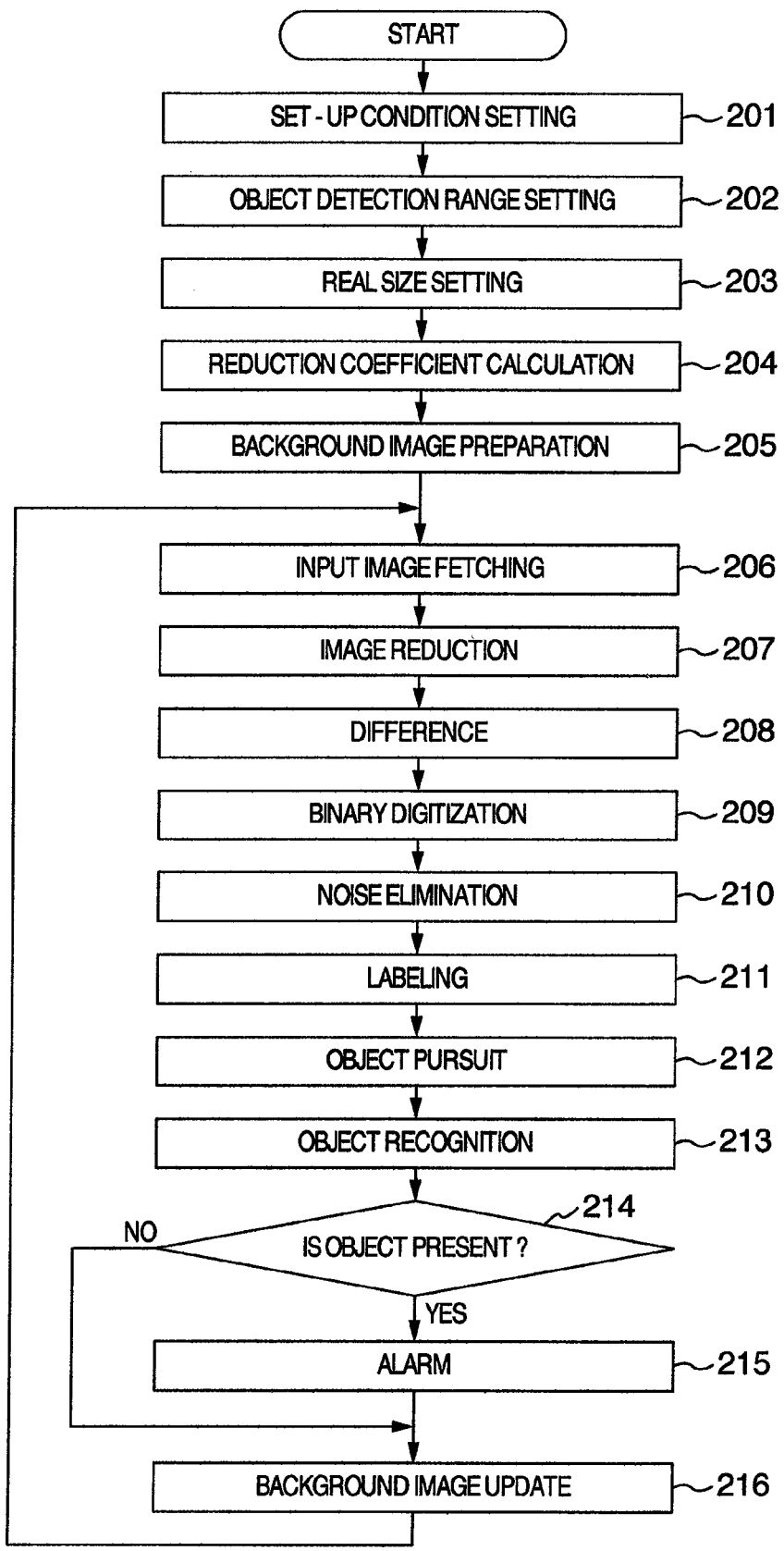
FIG. 2 is a flowchart for explaining procedural operations in an object detection method according to the invention.
Figure 3:
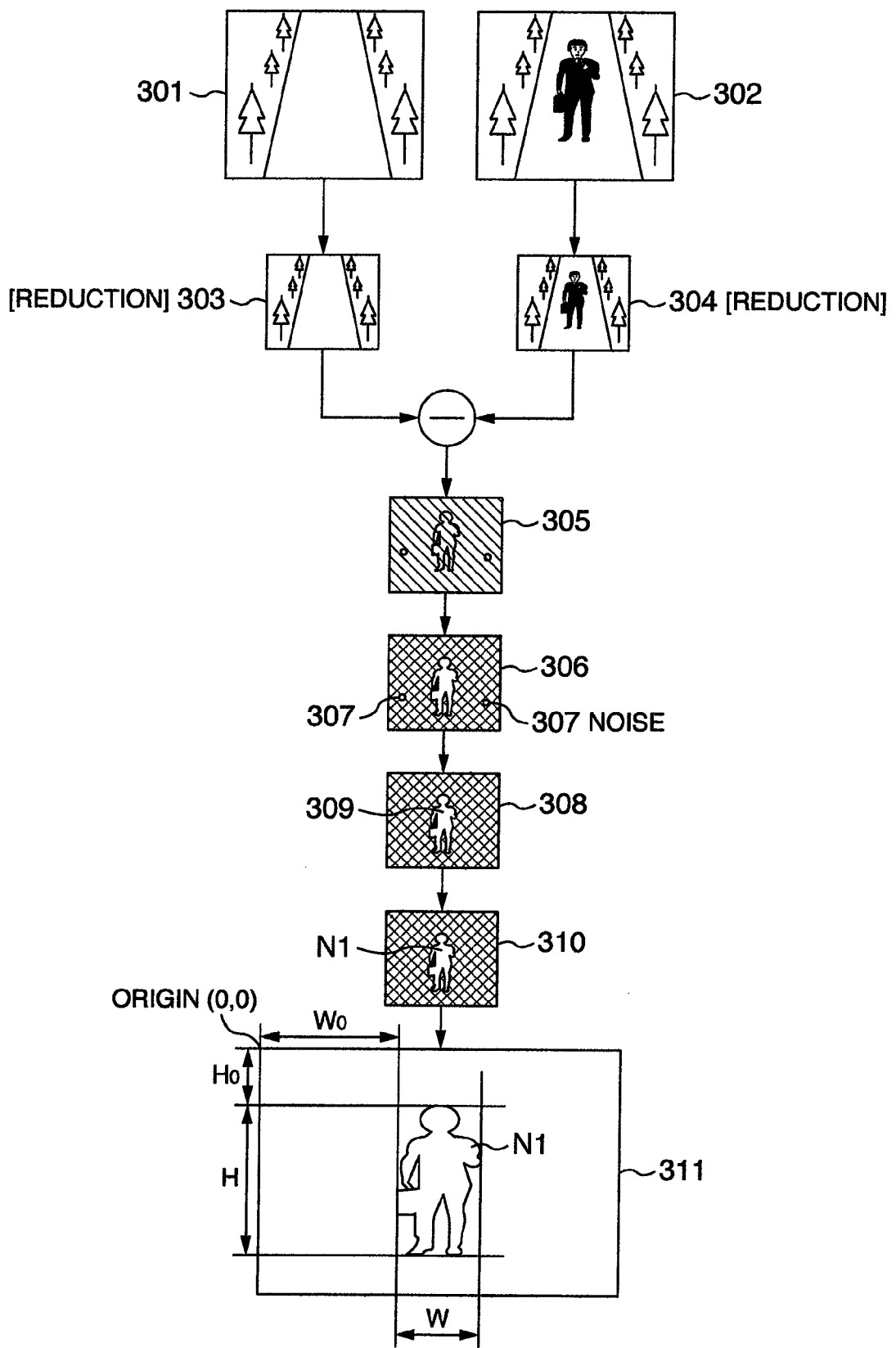
FIG. 3 is a schematic diagram for explaining the principle of the object detection method according to the invention.

Illustrated in FIG. 2 is a flowchart for explaining procedural operations in the object detection method of the invention and in FIG. 3 is a schematic diagram for explaining the principle of the object detection method of the invention.

Referring first to FIG. 3, a background image 301 is stored precedently in the background memory 105, an input image 302 is inputted from the camera 101 and stored in the input memory 106, a reduction image 303 of background image 301 is stored in the reduction image memory, a reduction image 304 of input image 302 is stored also in the reduction image memory, and a difference image 305 is obtained by making subtraction pixel by pixel between individual brightness values between the reduction input image 304 and reduction background image 303.

Each of the background image 301 and input image 302 has the size in terms of the number of pixels amounting to 640 horizontal pixels×480 vertical pixels. Each of the reduction images 303 and 304 has the size in terms of the number of pixels amounting to 320 horizontal pixels×240 vertical pixels.

The difference image 305 is represented by an image having, like the input image, brightness differences of a gradation of 256 grades in respect of individual pixels but this is difficult to indicate in FIG. 3 and is therefore replaced by schematic hatching illustration.

The brightness value of difference image 305 for each pixel is binary-coded with a predetermined threshold value so that the pixel brightness value below the threshold may be converted to "0" and the pixel brightness value above the threshold may be converted to "255" (in the case of 256 gradation of 0 to 255 bits), thus producing a monochrome image 306 (the brightness value being "0" at double hatched portion and the brightness value being "255" at the rest).

A noise image area of "255" brightness value in the monochrome image 306 is designated at 307 and the noise image area 307 of less than a predetermined pixel size is eliminated from the monochrome image 306 to provide a noise removed image designated at 308. It should be understood that the noise image area 307 is a lump of pixels constituted by one to several pixels (predetermined pixel size).

An area of "255" brightness value remaining after the noise elimination is an image area 309 which is recognized as a detecting object.

The image of "255" brightness value remaining in the noise removed image 308 is numbered to provide a labeling image 310 and since, in FIG. 3, one lump of image area 309 out of the two noise image areas 307 and one image area 309 remains, the first image area of "255" brightness value is determined which is allotted with "N1".

The size of the labeled image is measured to provide an object recognition image 311. For example, the labeled recognition image N1 is expressed for the size of its individual pixels in terms of the number of pixels and is then stored. The size of the recognized object takes the form of, for example, a rectangle surrounding the area of the object, having a size W corresponding to the number of pixels in horizontal direction and a size H corresponding to the number of pixels in vertical direction. At that time, in addition to the data representative of the pixel number, positional coordinates of one out of four points of the screen (for example, $W_0$, $H_0$) are also stored in the memory.

The size of each image is shown exaggeratedly or depressively in FIG. 3 for convenience of explanation only and does not accord absolutely or relatively with the real image size.

Figure 4:
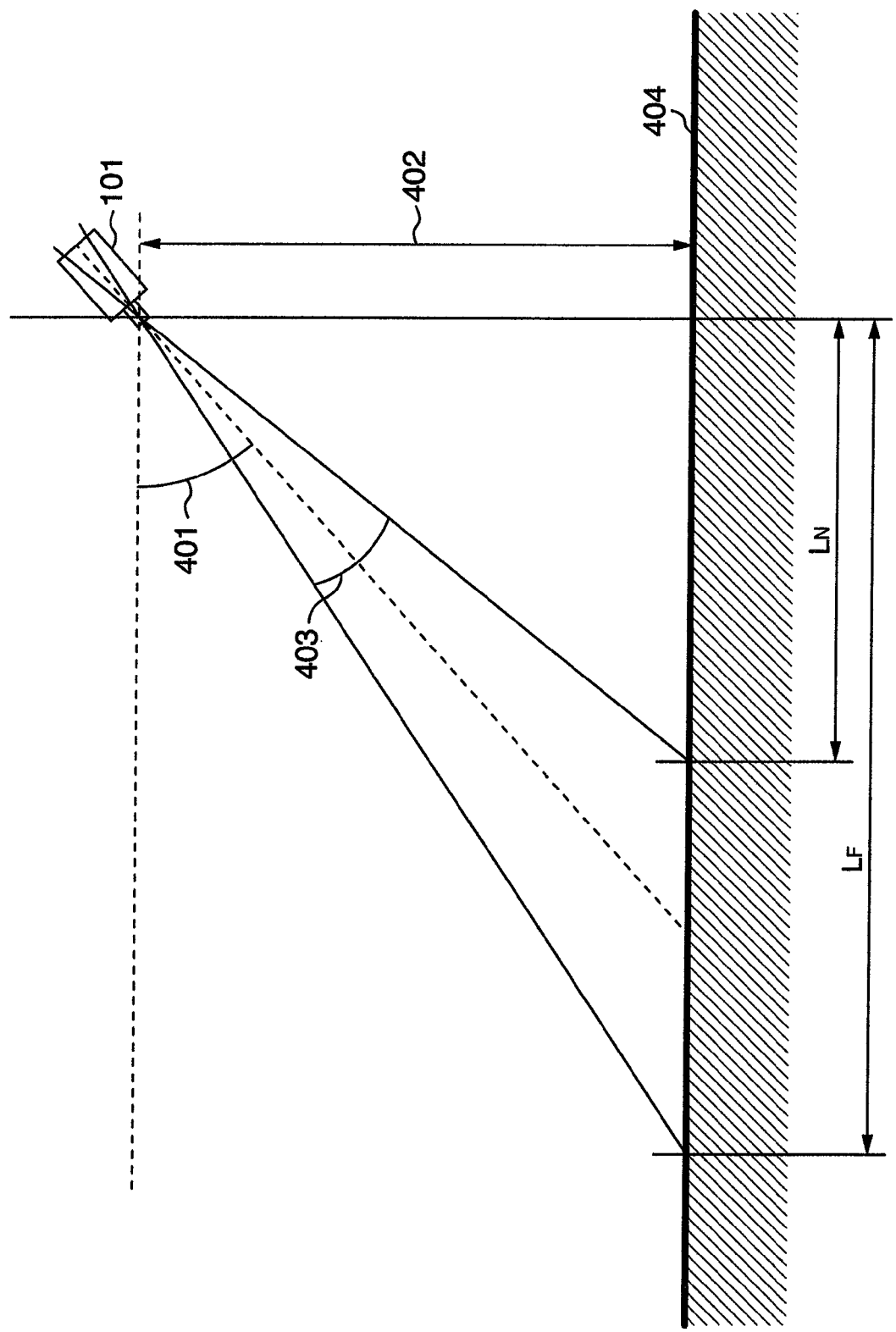
FIG. 4 is a diagram for explaining in side view form an embodiment of a method of setting camera set-up conditions according to the invention.
Figure 5:
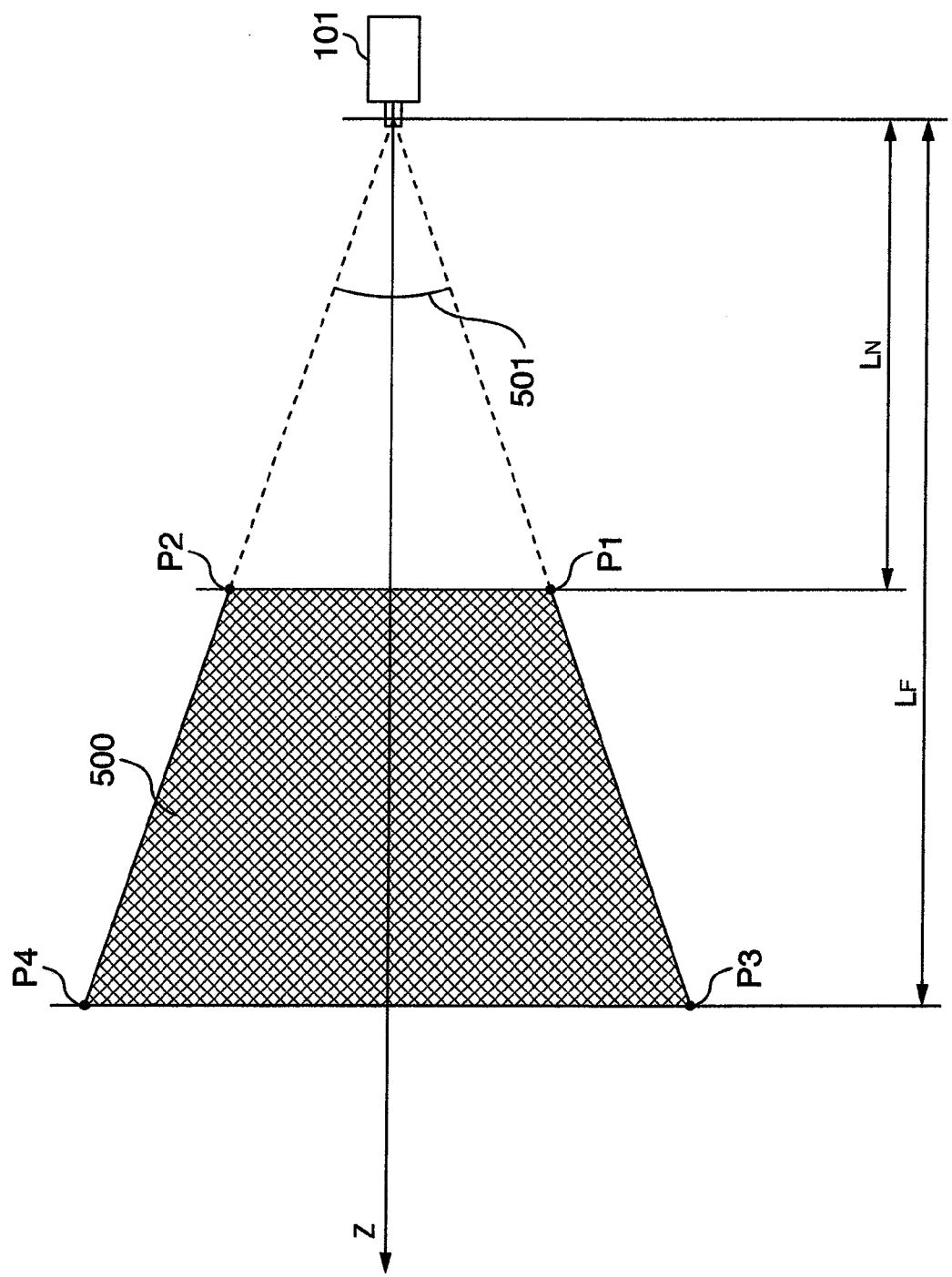
FIG. 5 is a diagram for explaining in plan view form the embodiment of the method of setting camera set-up conditions according to the invention.

Turning to FIG. 4, an embodiment of a method of setting camera set-up conditions according to the present invention will be described. The camera 101 exhibits a depression angle 401, a set-up height 402 (distance from horizontal ground or the surface of the earth 404) and a view-field angle 403 in the vertical direction, the horizontal ground 404 lying to include the monitor area. In FIG. 4, the camera 101 is illustrated diagrammatically in view form sideward of and parallel to the ground 404 while being sectioned on its optical axis in the vertical direction. In FIG. 4 and FIG. 5 as well to be described later, for simplicity of illustration, other constituents than the camera 101 (for example, a support such as a pole for mounting and supporting the camera 101, a power supply cable and other accessories) are not illustrated. Then, in the view-field of an image to be photographed by the camera 101, a horizontal distance from the camera 101 to the nearest location is represented by $L_N$ and a horizontal distance from the camera 101 to the remotest location is represented by $L_F$.

The embodiment of the method of setting the camera set-up conditions according to the invention will further be explained by also making reference to FIG. 5. The camera is illustrated in side view form in FIG. 4 whereas it is illustrated in plan view form from above in FIG. 5. In a trapezoid defined by points P1, P2, P3 and P4, a line segment connecting the points P1 and P2 shows in plan view form the location corresponding to the horizontal distance $L_N$ in FIGS. 4 and 5 and a line segment connecting the points P3 and P4 shows also in plan view form the location corresponding to the horizontal distance $L_F$ in FIGS. 4 and 5. The camera 101 exhibits a view-field angle 501 and the earth ground surface 404 is picked up at a pickup area 500 by means of the camera 101. A section on straight line Z corresponds to the illustration of FIG. 4.

The view-field angle 403 of camera in the vertical direction is determined by an aspect ratio (length/breadth ratio) of the camera 101 in use. For example, if a device having a ratio of a breadth of 4 to a length of 3 is used, the view-field angle 403 is 75% of the view-field angle 501 of camera 101 in the horizontal direction. Then, the zoom magnification is fixed to a given value by which an object to be picked up that is present between the distances $L_N$ and $L_F$ contouring the pickup area 500 or is assumed to enter the pickup area can be picked up within the focal distance.

Figure 6:
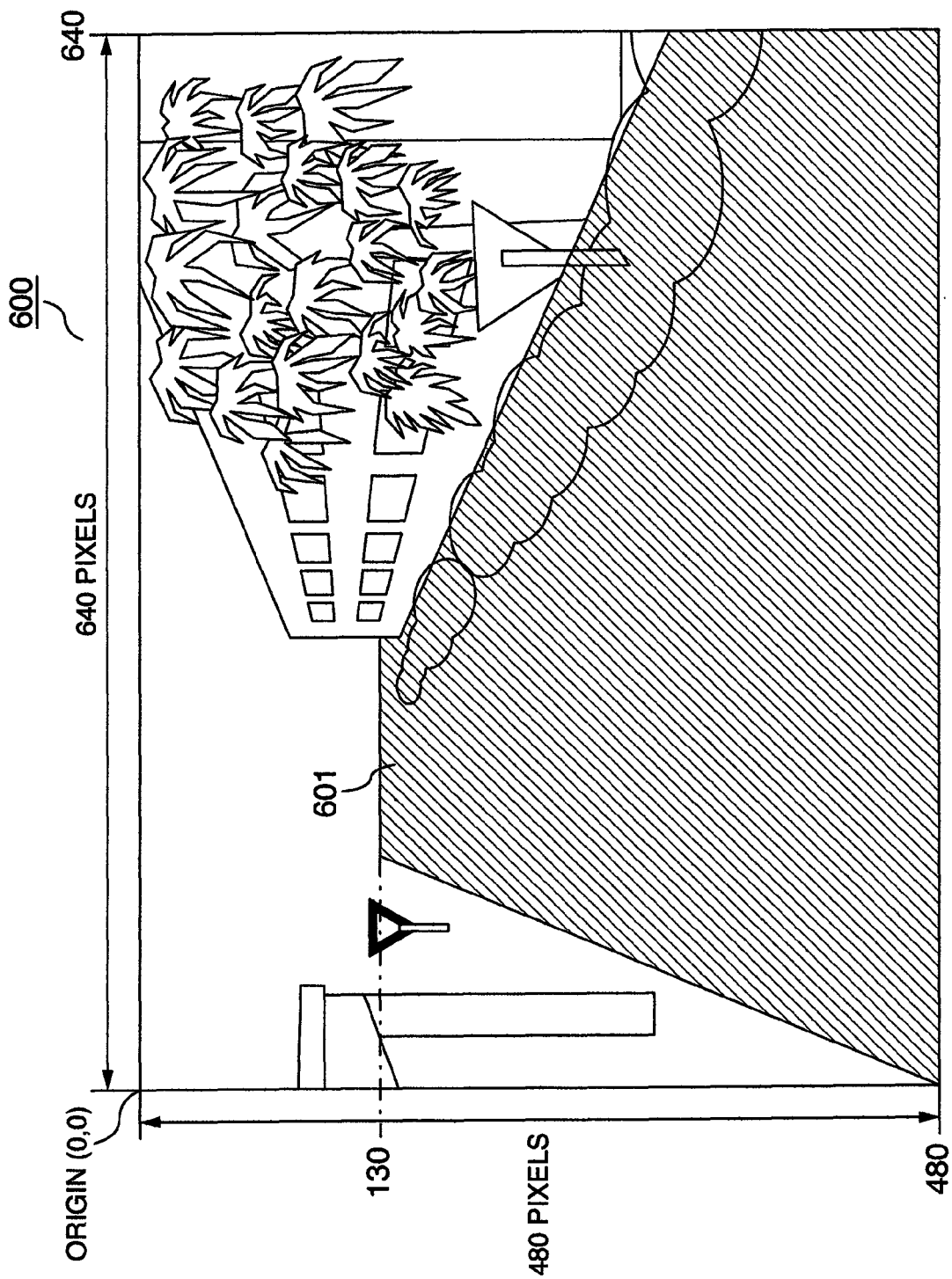
FIG. 6 is a diagram for explaining an embodiment of a method of setting an object detection range according to the invention.

An image of monitor area picked up by the camera 101 is displayed on the video monitor 115 as exemplified in FIG. 6. An image 600 is displayed on the display screen of video monitor 115 (display image) and the user sets an object detection range (hatched portion) 601 while watching the display image 600.

Like FIG. 8 to be referred to later, the number of pixels of one screen (one frame) of an image amounts to 640 horizontal (x-coordinate) pixels and 480 vertical (y-coordinate) pixels. At that time, the positional coordinates (x, y) of a pixel at an upper leftmost corner are (0, 0), the positional coordinates of a pixel at an upper rightmost corner are (640, 0), the positional coordinates of a pixel at a lower leftmost corner are (0, 480) and the positional coordinates of a pixel at a lower rightmost corner are (640, 480). Then, the origin (0, 0) of positional coordinates corresponds to, for example, the pixel at the upper leftmost corner of the screen.

Referring now to FIG. 2, a procedural operation is first executed in set-up condition setting step 201 in which depression angle 401, height 402 and view-field angle 501 in horizontal direction of the camera 101 are set as the set-up conditions of the camera 101 through designation by a user or custodian (hereinafter, referred to as the user). But, if the camera 101 is a fixed camera as in the case of the FIG. 1 embodiment, values set when the camera is installed may be inputted by way of an input unit not shown or the set values may be written previously in a program for object detection procedure, thus dispensing with the input operation.

Next, in object detection range setting step 202, a procedure for setting an object detection range 601 as shown in FIG. 6 is executed through designation by the user. The object detection range signifies a partial area of the monitor area within which the object detection procedure is carried out.

The object detection range 601 is expressed as a trapezoidal form in this example but it may be a square or circular form or polygon (for example such as pentagon, octagon). When designating the range 601 in the form of a trapezoid, a general method may be adopted according to which the user designates individual apices defining the object detection range. Alternatively, an object detection range composed of a plurality of areas may be employed.

The object detection range setting step 202 can sometimes be omitted. More particularly, when the user does not set an object detection range and the program proceeds to the next step, an object detection range coincident with the entire screen is set. The object detection range setting step 202 may otherwise be deleted from the process program per se. In this case, too, the entire screen is set as an object detection range. The entire screen herein means the maximum view-field range the camera 101 for photographing the inside of the monitor area can pickup and corresponds to the display image 600 in FIG. 6.

Subsequently, in real size setting step 203, a procedure for setting a real size of an object desired to be detected (object subject to detection) is executed through designation by the user. For example, when a grown-up person standing upright is desired to be detected, a width (W) of 0.5 [m] and a height (H) of 1.7 [m] are set. In this case, an object to be detected is a person, for example, standing upright and the representative such as a mean value of widths (W) and heights (H) of grown-up people assumed to pass through the monitor area are set. Here, the width (W) is a size in horizontal direction on the screen (display image 600) and the height (H) is a size in vertical direction on the screen (display image 600).

Actually, however, minimum/maximum values are calculated automatically for the thus set width (W) and height (H) when detecting an object and therefore the size to be set can be rough. For example, for width (W) "0.5 [m]" and height (H) "1.7 [m]", such a predetermined range as defining width (W) "0.3 to 0.8 [m]" and height (H)"[1] to 2.5 [m]" is determined. This predetermined range can be settled by, for example, taking the statistics of widths (W) and heights (H) of grown-up people expected to pass through the monitor area and by obtaining, for example, a dispersion such as a standard deviation of data from a normal distribution.

Next, in reduction coefficient calculation step 204, a procedure for determining a reduction coefficient of an image (to be described later) is executed on the basis of the depression angle 401, height 402, view-field angle 403 in the vertical direction, view-field angle 501 in the horizontal direction the camera exhibits which are set in the set-up condition setting step 201 and the object detection range 601 as well set in the object detection range setting step 202 and besides the width (W) and height (H) of the detecting object set in the real size setting step 203.

Thereafter, in background image preparing step 205, a procedure is executed in which a background image devoid of an object is prepared and the thus prepared image is stored in the background memory 105, thus providing a background image 301.

In input image fetching step 206, a procedure is executed in which the latest image picked up by the camera 101 is fetched and is then stored as an input image 302 in the input memory 106. It will be appreciated that the camera 101 picks up and delivers, for example, images of 30 frames during 1[s]. But, not all images delivered out of the camera 101 are fetched as an input image. For example, one frame out of 60 frames (or one image during 2[s]) or for example, one frame out of 100 frames is fetched and the fetched image is subjected to the image processing.

In image reduction step 207, the background image 301 stored in the background memory 105 and the input image 302 stored in the input memory 106 are reduced by using an image reduction coefficient obtained in the image reduction coefficient calculation step 204 to prepare a reduced background image (reduction background image) 303 and a reduced input image (reduction input image) 304. The thus prepared reduction background image 303 and reduction input image 304 are stored in the reduction image memory 107.

In difference step 208, a procedure is executed in which the difference is calculated pixel by pixel over the entire screen between the reduction background image 301 and the reduction input image 304 both stored in the reduction image memory 107 to thereby prepare a difference image 305.

In binary-coding step 209, a procedure is executed over the entire screen in which the difference image 305 prepared in the difference step 208 is subjected to a threshold value process pixel by pixels to prepare a monochrome image 306 according to which a pixel having a difference value being less than the threshold is set to a brightness value "0" and a pixel having a difference value being larger than the threshold is set to a brightness value "255" (the brightness value of one pixel is expressed in 256 gradations of from "0" to "255"), thus preparing the monochrome image 306.

In the monochrome image 306, an area of pixels of brightness value "0" is an area where no object is detected and an area of pixels of brightness value "255" (a lump of pixels) is considered as an area where a detection object exists (as a candidate for an object to be detected).

Next, in noise elimination step 210, a noise elimination process is carried out. In the noise elimination process, it is decided on the basis of the size of an area of picked-up pixels whether a detected object (a pixel area having a brightness value of 255 in the monochrome image, that is, a candidate for an object to be detected) is the object to be detected.

In the monochrome image 306, a lump of pixels of 255 brightness value considered to include a detection object will conceivably contain an object that need not be detected. For example, even when a person is desired to be detected, it is conceivable that a small animal such as a cat or a falling leaf will be detected. Further, noises generated during actual image pickup will be involved. Therefore, by executing a process of noise elimination to be described later, an unnecessary pixel lump must be eliminated from a candidate for an object to be detected.

More specifically, in the noise elimination step 210, a procedure is executed in which a lump of pixels that is outside the range of the number of pixels (width and height) corresponding to a real size (for example, width "0.3 to 0.8 [m]" and height "1 to 2.5 [m]") of a detecting object set in the real size setting step 203 is eliminated from the monochrome image 306 obtained in the binary-coding process step 209, thus preparing a noise removed image 308.

In labeling step 211, a procedure for numbering an object by using the noise removed image 308 prepared in the noise elimination step 210 is executed. More specifically, the procedure is executed such that individual lumps of pixels each having the brightness value 255 in the prepared noise removed image 308 are numbered (labeled) so as to be discriminated from each other. Namely, a procedure for correlating, for example, "N1" to the individual lumps of pixels as shown at the labeling image 310 in FIG. 3 is executed (successively, for example, "N2" is correlated to a second lump of pixels, "N3" is correlated to a third lump of pixels and so on). As a result of labeling, a labeling image 310 is prepared.

Through the labeling step 211, an object area 309 acquired in the noise removed image 308 is allotted with, for example, an ordinal number "N1".

In object pursuit step 212, a procedure is executed in which a one-frame preceding object is correlated to an object of present frame to acquire pursuit information of object.

In object recognition step 213, a procedure is executed in which for the object N1 obtained in the labeling step 211, width (W) and height (H) of the object are calculated and on the basis of the calculated width and height of the object, the object is decided as to whether to be an object desired to be recognized, thus ensuring that only an object desired to be recognized can be extracted.

In object presence/absence deciding step 214, a procedure is executed in which the presence/absence of a recognition object is decided by using the result of decision in the object recognition process step 213. If the presence of an object is determined, the program proceeds to alarm step 215.

With the presence of an object determined, it is decided whether a lump of pixels of the object (for example, object N1) settled as an object desired to be recognized in the object recognition processing step 213 falls into the object detection range set in the object detection range setting step 202. If the object detection range has not been set, the entire screen impersonates an object detection range, so that lumps of pixels of objects (for example, object N1) settled in the object recognition processing step 213 as objects desired to be recognized are all determined as being of the presence of object.

In deciding whether the lump is inside the object detection range, a decision is made as to whether, in the lump of pixels of the object determined as the object desired to be recognized in the object recognition processing step 213, a pixel being nearest to the camera 101 is present in the object detection range. This is because the detecting object is assumed to move along the ground (earth ground surface) and besides, in an image picked up by the camera, the distance from the camera nears by approaching the lower side of the screen.

In the alarm step 215, the alarm is given to the outside. If the absence of an object is determined, the program proceeds to background image update step 216.

In the background image update processing step 216, the background image is updated to obtain an image which in turn is stored in the background memory 105 and the program returns to the input image fetching step 206 to again execute the steps following the input image fetching step 206.

In the alarm step 215, not only the alarm is given but also the image of the detected object may be displayed on a different monitor, saved, or transmitted to a predetermined client, at least one of which may be executed. The background image update step 216 may be omitted or may be replaced by appropriate manual setting by the user. The image of the detected object to be displayed, saved or transmitted may be an image before or after the reduction or may otherwise be an image of a different format.

To add, in the present invention, during the object pursuit step 212, object recognition step 213, alarm step 215 and background image update step 216, the conventional general pursuit process may be executed in respect of a detected object.

Next, details of the reduction coefficient calculation step 204 explained in connection with the foregoing embodiments will be described by making reference to FIGS. 7 and 8 in addition to FIGS. 1 to 6.

Figure 7:
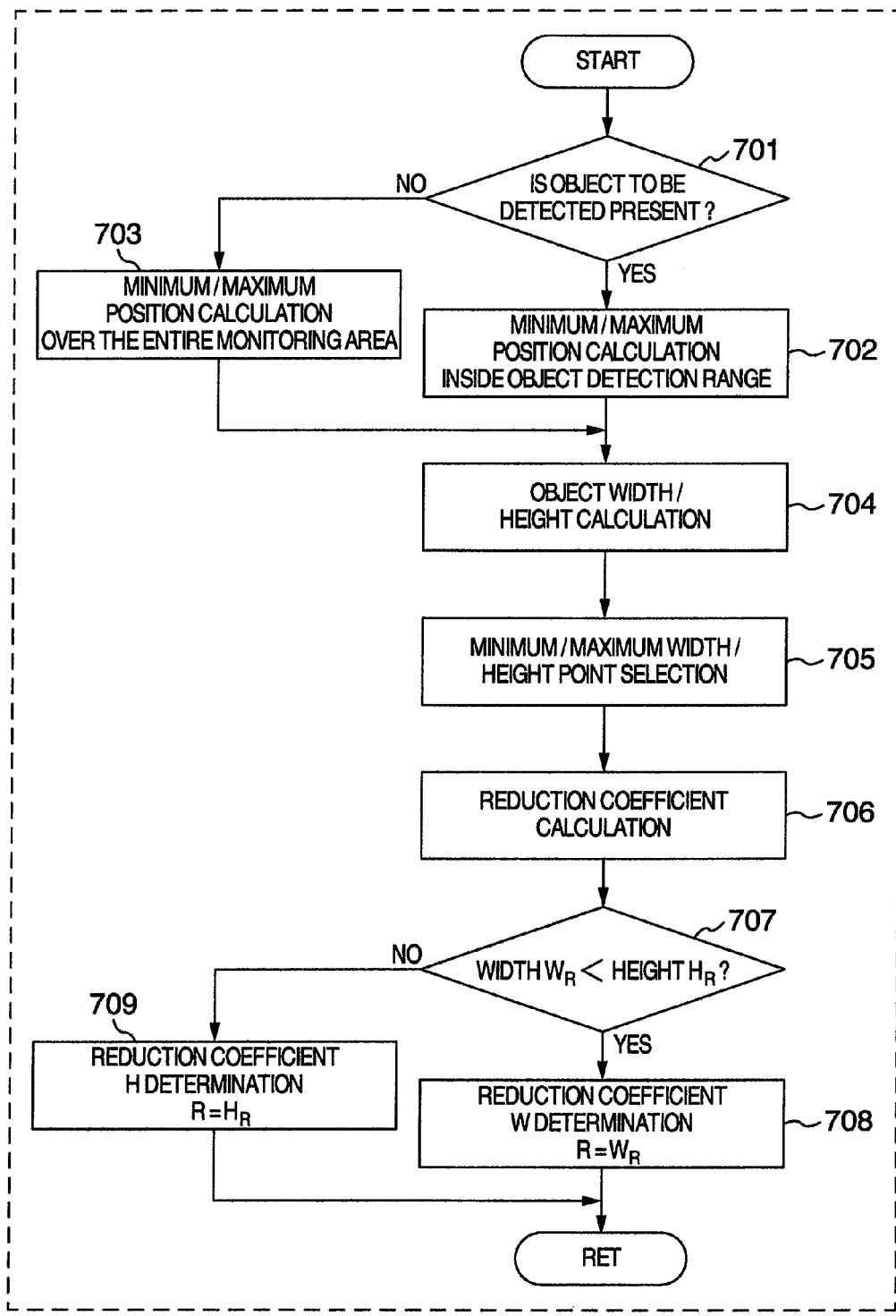
FIG. 7 is a flowchart for explaining an embodiment of procedural operations in a method of calculating an image reduction coefficient according to the invention.

A flowchart shown in FIG. 7 is for explaining an embodiment of procedural operations in the image reduction coefficient calculation method according to the present invention. Illustrated in FIG. 8 is a diagram useful to explain the embodiment of the image reduction coefficient calculation method of the invention. In FIG. 8, the object detection range 601 will be explained by using coordinates. There are illustrated in FIG. 8 a displayed image 600, an object detection range 601 set by the user while watching the displayed image 600, left end/right end points 801a and 801c at the remotest position of the detection range 601 set by the user, and left end/right end points 801b and 801d at the most frontal position of the detection range 601 set by the user. Here, the points 801a and 801c are defined as the left/right ends because in the absence of a building or the like, the detection range is an area surrounded by the points 801a, 801b, 801c and 801d. The remotest boundary line of object detection range 601 (a virtual line indicative of the minimum Y of object detection range) is designated at reference numeral 802 and persons are designated at reference numerals 803a, 803b, 803c and 803d. The persons 803a, 803b, 803c and 803d are sample images arranged to show that the width (W) and height (H) of a person changes relatively in accordance with positional coordinates on the screen.

In FIG. 7, it is decided in object detection range decision step 701 whether the object detection range 601 is set in the object detection range setting step 202. With the presence of the object detection range 601 settled, step 702 of calculating minimum/maximum position inside the object detection range is executed to acquire a minimum X position, a maximum X position, a minimum Y position and a maximum Y position and then, the program proceeds to object width/height calculation step 704. If the object detection range 601 has not been set, the program proceeds to step 703 of calculating minimum/maximum positions in the entire monitor area.

The minimum X position corresponds to x coordinates of a pixel at a point remotest from the camera 101 in the object detection range 601 and the minimum Y position corresponds to y coordinates of a pixel at a point remotest from the camera 101 in the object detection range 601. Likewise, the maximum X position corresponds to x coordinates of a pixel at a point nearest to the camera 101 in the object detection range 601 and the maximum Y position corresponds to y coordinates of a pixel at a point nearest to the camera 101 in the object detection range 601.

In the entire monitor area minimum/maximum position calculation step 703, the x coordinates of the minimum X position are set to "0", the x coordinates of the maximum X position are set to "640" (=image size $W_M$), the y coordinates of the minimum Y position is set to "130" and the y coordinates of the maximum Y position is set to "480" (=image size $H_M$). Thereafter, the program proceeds to the object width/height calculation step 704.

The reason why minimum X position–maximum X position is made to coincide with the image size $W_M$ is that the detecting object is less affected by the difference based on a scenograph at a position parallel to the ground (earth ground surface) and hence factors for changing the reduction coefficient are a few. Contrarily, the minimum Y position is set not to "0" but to "130" for, in the case of FIG. 8, a remote boundary (which the ground ends in) of the monitor area (see the boundary 802 in FIG. 6 or 8) corresponds to y coordinated of 130. In other words, this is because even if the object detection range 601 has not been set, a detecting object or an object to be detected does not exist in a remote area beyond the boundary (having y coordinates "130" to "0") or even if existing in this area, the object cannot be a target of detection.

In the object width/height calculation step 704, the size of the detecting object set in the real size setting step 203, for example, represented by a width of 0.5 m and a height of 1.7 m is converted into pixel numbers (the number of pixels) at the points 801a, 801b, 801c and 801d and the program proceeds to minimum/maximum width/height point selecting step 705.

For conversion of the width, height, area and the like of an object on an image into values of real coordinates, a general method described in JP-A-7-37063 or JP-A-2005-057743, for example, will be adopted.

In the minimum/maximum width/height point selecting step 705, the widths (pixel numbers) and heights (pixel numbers) at the points 801a, 801b, 801c and 801d which are obtained in the object width/height calculation step 704 are decided as to their magnitudes and a point having the minimum width and the minimum height is selected and the program proceeds to reduction coefficient calculation step 706.

Figure 8:
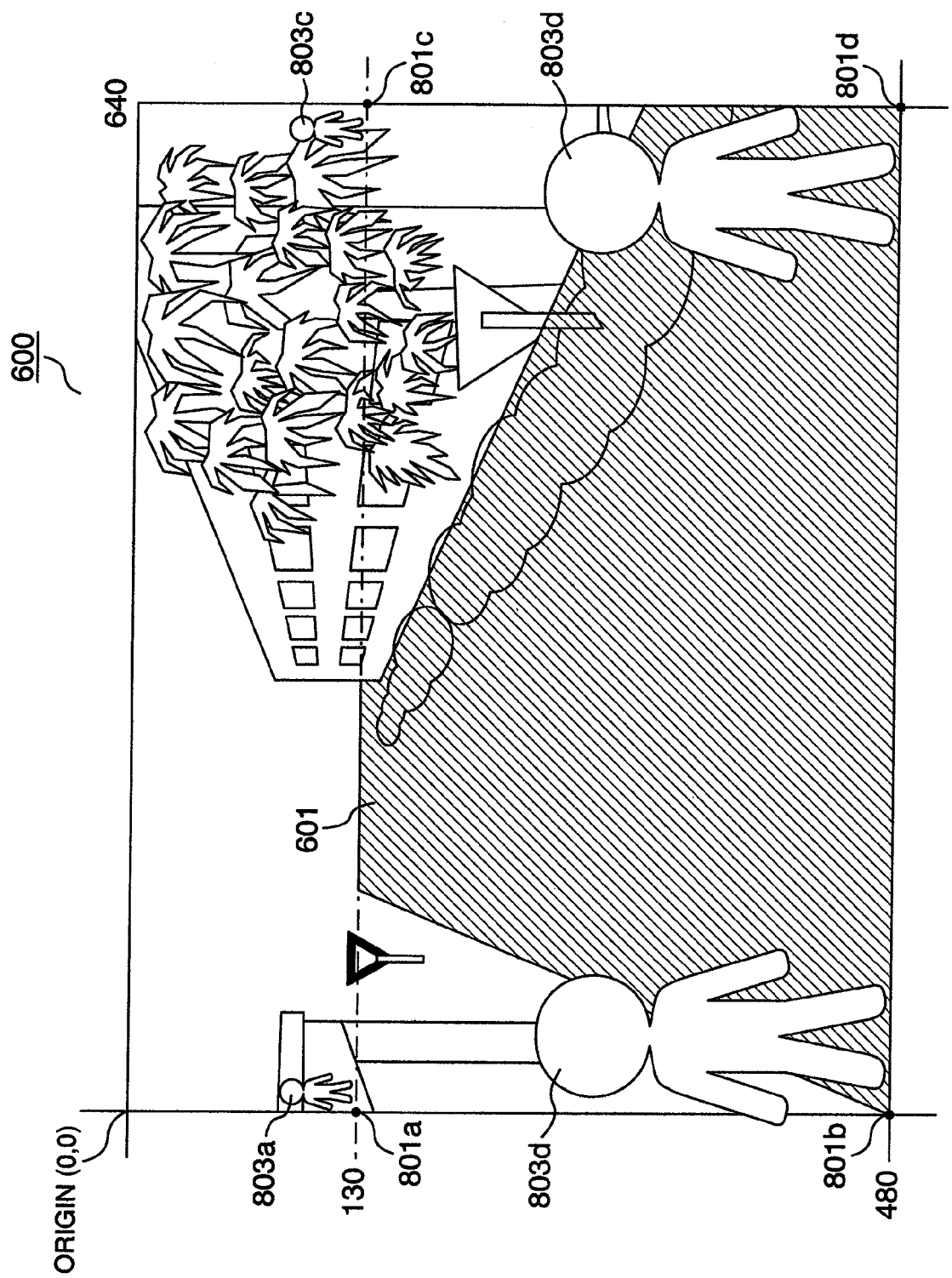
FIG. 8 is a diagram for explaining an embodiment of the method of calculating an image reduction coefficient according to the invention.

In the case of the FIG. 8 embodiment, the point 801a or 801c is selected. For example, the point 801a is selected and minimum width $W_{0min}$ and minimum height $H_{0min}$ are determined.

In the reduction coefficient calculation step 706, reduction coefficient width $W_R$ and reduction coefficient height $H_R$ are calculated by using the minimum width $W_{0min}$ and minimum height $H_{0min}$ obtained in minimum/maximum width minimum/maximum height calculation step 705.

A coefficient $K_S$ used for the reduction coefficient width/height calculation step 706 is set in terms of arbitrary number (for example, "1.5", "2" or the like) and the detectable width $W_D$ and height $H_D$ are set in terms of pixel number (the number of pixels).

For example, when the minimum with detectable with the image processing apparatus is 10 pixels and the detectable minimum height is 20 pixels and if the minimum width $W_{0min}$ of an object desired to be detected at a point having the selected minimum width and height is 40 pixels, the reduction coefficient is set to "2".

In reduction coefficient width/height decision step 707, reduction coefficient width $W_R$ and reduction coefficient height $H_R$ obtained in the reduction coefficient width/height calculation step 706 are decided as to their magnitudes.

If the reduction coefficient width $W_R$ is smaller than the reduction coefficient height $H_R$, the program proceeds to reduction coefficient W determining step 708 and if the reduction coefficient width $W_R$ is larger than or equal to the reduction coefficient height $H_R$, the program proceeds to reduction coefficient H determining step 709.

In the reduction coefficient W determining step 708, reduction coefficient R is settled as the reduction coefficient width $W_R$, thus ending the process (with the program caused to proceed to the step 208 in FIG. 2).

In the reduction coefficient H determining step 709, the reduction coefficient R is settled as the reduction coefficient height $H_R$, thus ending the process (with the program caused to proceed to the step 208 in FIG. 2).

In this manner, a smaller reduction coefficient is selected in order to secure the detection accuracy.

As described above, the present invention provides the method of calculating the image reduction coefficient in the invading object recognition image processing. According to the aforementioned embodiment, the image reduction coefficient is automatically determined from the parameters such as the set photographing condition, detection range and real size of a detecting object. This ensures that the process can be carried out at a high speed while keeping the detection accuracy intact.

Namely, according to the present embodiment, since the image reduction coefficient can be set to an appropriate value in accordance with the installation environment, the processing can be carried out at a high speed while keeping the detection accuracy intact.

In the foregoing embodiments, after the differential process between the background image and the input image (background difference process) has been executed, the binary-coding process is carried out. But, apart from the background difference process, a differential process may be executed between input images (inter-frame difference) and thereafter, the binary-coding process may be carried out to perform object detection.

In the foregoing embodiments, the view-field angle is set but since the view-field angle can be calculated from the focal distance of lens and the CCD size of camera, a method for setting the lens focal distance and the CCD size may alternatively be adopted.

If in the embodiment shown in FIGS. 4 and 5 the distance from camera 101 to point P1 equals the distance from camera 101 to point P2 and the distance from camera 101 to point P3 equals the distance from camera 101 to point P4, the parameter in horizontal direction (x coordinates) need not be taken into consideration in the reduction coefficient calculation step 204 in FIG. 7. Accordingly, in this case, processing can be omitted in connection with x coordinates.

In addition, the location where the camera 101 can be installed is restricted depending on the monitor area and the camera set-up cannot be accomplished under ideal conditions. For example, the earth ground surface is infrequently horizontal. Further, depending on the topography, the camera 101 per se needs to be rotated about the center of its optical axis. Accordingly, although not described in connection with FIGS. 4 and 5, the rotation of picture angle of the camera may be considered in the FIG. 7 process and the camera 101 per se may be rotated about the center of its optical axis in order to pick up the earth ground surface as horizontally as possible.

In the foregoing embodiments, the camera for photographing the monitor area was a camera for outputting an analog video signal. But, the camera is not limited to this type and a camera for outputting a digital video signal may be employed. Further, the camera in use is not limited to one in number and two or more cameras may be used and besides a monitor system may be employed in which a camera for delivery of an analog signal and a camera for delivery of a digital signal coexist.

Furthermore, even when the video signal delivered out of the camera is a digital signal, the digital signal is processed in order for it to be transmitted from the camera to the image processing apparatus (video processing apparatus) and therefore, the image input I/F, even if dispensing with its A/D conversion function, must be provided for the image processing apparatus in order that the digital signal can be converted into a format the image processing apparatus can deal with.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image processing apparatus for detecting an input image received from a camera, the camera being adapted to photograph the inside of a monitor area, and monitoring the inside of the monitor area by using an object recognition method, the apparatus comprising:

means for inputting set-up information of the camera, and object detection range inside the monitor area, and a real size of an object desired to be detected;

means for selecting a point at which the size of the object desired to be detected is minimized inside the object detection range, and for calculating a reduction coefficient from a lump of pixels of the object at the selected point based on the set-up information of the camera, the object detection range inside the monitor area, and the real size of the object desired to be detected;

means for storing an image of the monitor area viewed from the camera as a background image;

means for storing an actual image viewed from the camera as the input image;

means for inputting said input image and said background image and for reducing both of said input image and said background image using said reduction coefficient to prepare a reduced input image and a reduced background image, respectively;

means for performing a differential process between said reduced input image and said reduced background image to prepare a difference image,
wherein the background image is eliminated from the difference image;
means for binary-coding the difference image to prepare a monochrome image composed of a minimum brightness and maximum brightness, based on a predetermined threshold;
means for generating a noise eliminated image be eliminating the lump of pixels as a noise region from the monochrome image;
wherein the noise region is not included in the number of pixels corresponding to the real size of the object desired to be detected; and
means for recognizing the object from said noise eliminated image.

2. The image processing apparatus according to claim 1, wherein when said binary coded monochrome image is composed only of the minimum brightness, then the background image is updated by replacing with the input image as the object not being detected.

* * * * *